US007369790B2

(12) United States Patent
Nishimura

(10) Patent No.: US 7,369,790 B2
(45) Date of Patent: May 6, 2008

(54) PROCESS CARTRIDGE INCLUDING PAPER DUST REMOVAL MEMBER

(75) Inventor: Soichiro Nishimura, Handa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 41 days.

(21) Appl. No.: 10/889,061

(22) Filed: Jul. 13, 2004

(65) Prior Publication Data

US 2005/0019056 A1 Jan. 27, 2005

(30) Foreign Application Priority Data

Jul. 25, 2003 (JP) ............................ 2003-280023

(51) Int. Cl.
*G03G 21/00* (2006.01)
*G03G 15/20* (2006.01)
*B32B 7/12* (2006.01)

(52) U.S. Cl. ........................ 399/98; 399/123; 399/353; 428/343

(58) Field of Classification Search .................. 399/98, 399/123, 353; 428/343
See application file for complete search history.

(56) References Cited

U.S. PATENT DOCUMENTS 5,351,108 A * 9/1994 Mizutani .................... 399/98
6,304,735 B1 10/2001 Nishimura et al.

FOREIGN PATENT DOCUMENTS

JP A 6-108021 4/1994
JP A 6-138723 5/1994
JP 2001159839 A * 6/2001
JP A 2001-159839 6/2001

* cited by examiner

*Primary Examiner*—David M. Gray
*Assistant Examiner*—Joseph S. Wong
(74) *Attorney, Agent, or Firm*—Oliff & Berridge, PLC

(57) ABSTRACT

An image forming device includes a paper dust removal unit that removes paper dust from a photosensitive member. The paper dust removal unit includes a brush-shaped member affixed to a plate by a two-sided tape. The brush-shaped member is peeled off from the plate so as to re-use the plate and the like of the paper dust removal unit. The tensile strength of the two-sided tape is greater than the shear adhesive strength between the two-sided tape and the plate, so that the two-sided tape is prevented from tearing partway when the brush-shaped member is peeled off.

15 Claims, 5 Drawing Sheets

PROCESS CARTRIDGE INCLUDING PAPER DUST REMOVAL MEMBER

BACKGROUND OF THE INVENTION

1. Field of the Invention

The present invention relates to a process cartridge that is provided with paper dust removal means for removing paper dust from an image holding member, and also to an image forming device that includes the process cartridge.

2. Related Art

Japanese Patent Application-Publication No. 2001-159839 proposes a process cartridge that is provided with a paper dust removal device for removing paper dust from a photosensitive member. The paper dust removal device has a brush-shaped member that is formed of fibers and disposed between a transfer roller and a charger. A charge is applied to a brush of the brush-shaped member, so that the brush can trap paper dust by the force of the resultant electrical field. Paper dust is generally negatively charged and also charged to the opposite polarity of the toner by a bias applied during a transfer operation. Therefore, if a positively charged toner is used, then the paper dust is strongly negatively charged. Applying a voltage of the same polarity as that of the toner to the brush enables the brush-shaped member to efficiently trap paper dust without trapping the toner. The brush-shaped member is usually fixed by two-sided tape onto an electrically conductive plate, such as an aluminum plate. The two-sided tape includes a non-woven fabric and bonding layers on both sides of the non-woven fabric. The non-woven fabric exhibits electrical conductivity on absorbing moisture. Using a non-woven fabric as a substrate of the two-sided tape facilitates the transfer of charge to the brush, increasing the paper dust trapping capability of the brush.

However, the abovementioned technique has a problem in that when peeling off the brush-shaped member from the plate, the two-sided tape could tear partway and fragments of the two-sided tape could be left on the plate, so that a large amount of manual work is required for removing the two-sided tape from the plate completely.

Recent concern for protecting the environment has led to a trend towards reclaiming and reusing components in various electrical and electronic appliances, with the objective of saving resources and energy and reducing garbage.

In the process cartridge used in an image forming device, such as a printer, the brush of the brush-shaped member can become dirty or damaged whereas the holder including the plate to which the brush-shaped member is affixed is not particularly susceptible to damage and can be reused. Thus any tearing of the two-sided tape during the removal of the brush-shaped member will necessitate manual work in its removal, adversely affecting the feasibility of recycling the process cartridge.

SUMMARY OF THE INVENTION

In the view of foregoing, it is an object of the present invention to overcome the above problems, and also to provide a process cartridge and an image forming device including the process cartridge in which the two-sided tape can be peeled off in a simple manner.

In order to attain the above and other objects, according to one aspect of the present invention, there is provided a process cartridge that is detachably mounted onto an image forming device. The process cartridge includes an image holding member, a paper dust removal member that removes paper dust from the image holding member, and a conductive member that conducts a voltage supplied from the image forming device to the paper dust removal member. The paper dust removal member is attached to the conductive member by a two-sided tape. The two-sided tape has a substrate formed of non-woven fabric. The tensile strength of the two-sided tape is greater than a shear adhesive strength between the two-sided tape and the conductive member.

According to another aspect of the present invention, there is provided an image forming device including an image holding member, a charging unit that charges a surface of the image holding member, an irradiating unit that irradiates the surface of the image holding member with light to form an electrostatic latent image on the surface of the image holding member, a developing unit that develops the electrostatic latent image into a visible image, a transfer unit that transfers the visible image from the surface of the image holding member onto a recording medium, a conveying unit that conveys the recording medium, a paper dust removal member that removes paper dust from the image holding member, and a conductive member that is attached to the paper dust removal member by a two-sided tape. The two-sided tape has a substrate formed of non-woven fabric. A tensile strength of the two-sided tape is greater than a shear adhesive strength between the two-sided tape and the conductive member.

PREFERRED EMBODIMENT OF THE PRESENT INVENTION

An image forming device including a process cartridge according to a preferred embodiment of the present invention will be described with reference to the accompanying drawings.

Figure 1:
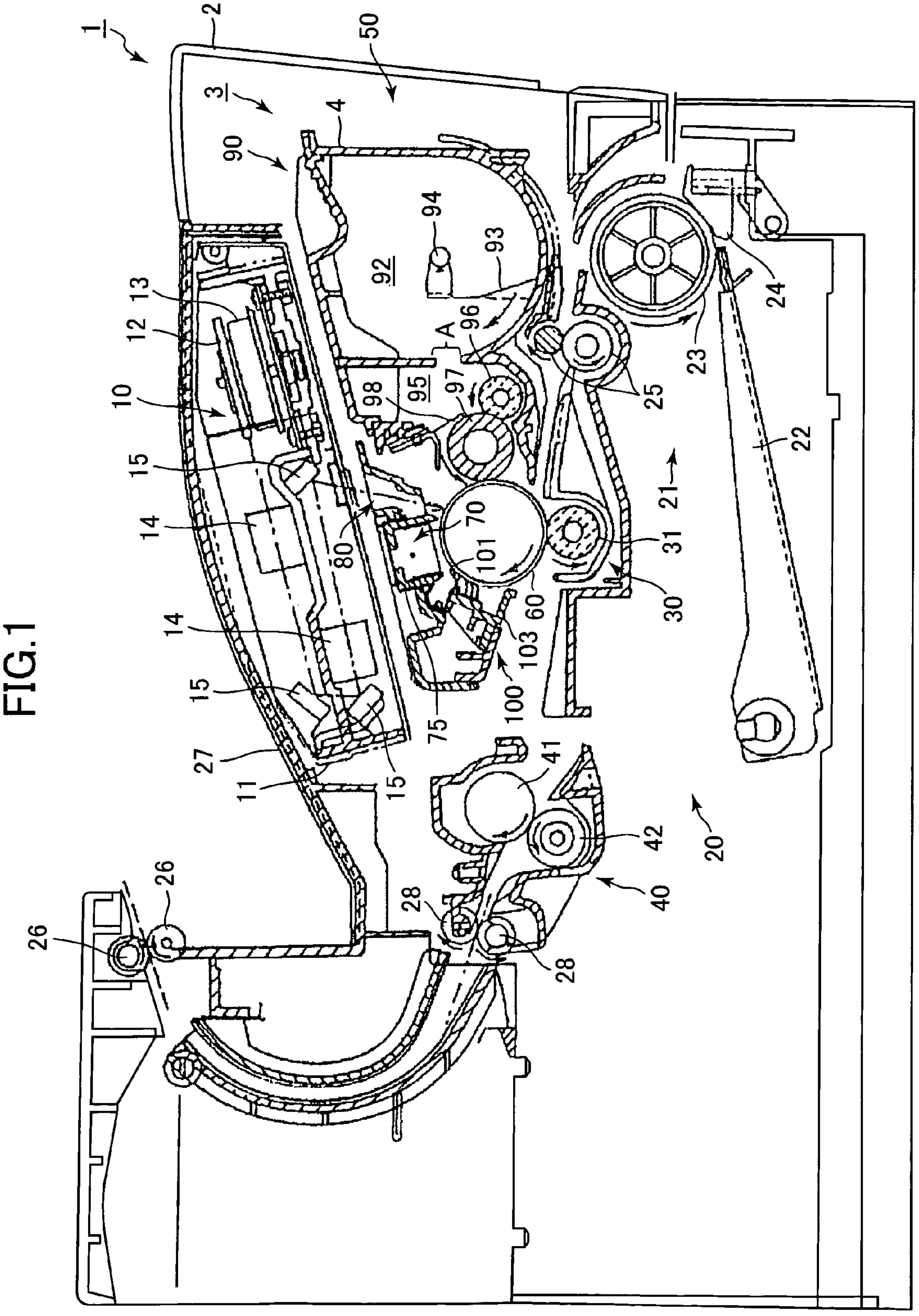
FIG. 1 is a cross-sectional view of an image forming device according to an embodiment of the present invention.

FIG. 1 shows an image forming device 1 according to the present embodiment. As shown in FIG. 1, the image forming device 1 includes a main casing 2, an optical unit 10, a conveying unit 20, a process cartridge 3, and a fixing unit 40.

The optical unit 10 is for exposing the surface of a photosensitive drum 60 (described later) by irradiating light that has been modulated on the basis of image information read out from an external device. The optical unit 10 includes a laser generator (not shown), a polygon mirror 12, a plurality of lenses 14, a plurality of reflecting mirrors 15, and a laser scanner unit 11 that accommodates those components.

When an image signal is received from an external device, such as a computer or wordprocessor, the laser generator generates a laser beam in accordance with the image signal and irradiates the same onto the polygon mirror 12. The polygon mirror 12 is driven to rotate at high speed by a scanner motor 13, and the light that is reflected off the polygon mirror 12 is incident on the photosensitive drum 60 via the lenses 14 and the reflecting mirrors 15. The incident light selectively exposes the surface of the photosensitive drum 60 to form a latent image corresponding to the image signal.

The conveying unit 20 includes a feeder unit 21, a pair of registration rollers 25, a pair of transport rollers 28, and a pair of discharge rollers 26.

The feeder unit 21 is for feeding a recording paper (not shown) and is disposed in a bottom section of the main casing 2. The feeder unit 21 includes a pressing plate 22, a feeder roller 23, and a separation member 24. The pressing plate 22 is urged upward by a spring (not shown), so that a stack of recording papers mounted on the pressing plate 22 is pressed against the feeder roller 23. The feeder roller 23 is rotatable in a direction indicated by an arrow in FIG. 1, and the separation member 24 is pressed against the feeder roller 23. When the feeder roller 23 is driven to rotate at a predetermined timing, an uppermost recording paper mounted on the pressing plate 22 is separated from the stack due to the friction between the feeder roller 23 and the separation member 24 and then fed in a conveying direction.

The registration rollers 25 are rotatably disposed downstream of the feeder roller 23 with respect to the conveying direction. The registration rollers 25 transport the recording paper to a predetermined transfer position at a predetermined timing.

The process cartridge 3 is detachably mounted inside the main casing 2 and includes the photosensitive drum 60, a charging unit 70, an irradiating section 80, a developing unit 90, a transfer unit 30, a paper dust removal unit 100, and a frame 4 that accommodates these components of the process cartridge 3. The charging unit 70, the irradiating section 80, the developing unit 90, the transfer unit 30, and the paper dust removal unit 100 are arranged around the photosensitive drum 60 in this order.

The photosensitive drum 60 includes organic photo conductor coated on a cylindrical base made of aluminum. The photosensitive drum 60 is supported on the frame 4 and driven to rotate in a direction indicated by an arrow in FIG. 1 by a drive motor (not shown).

Figure 2:
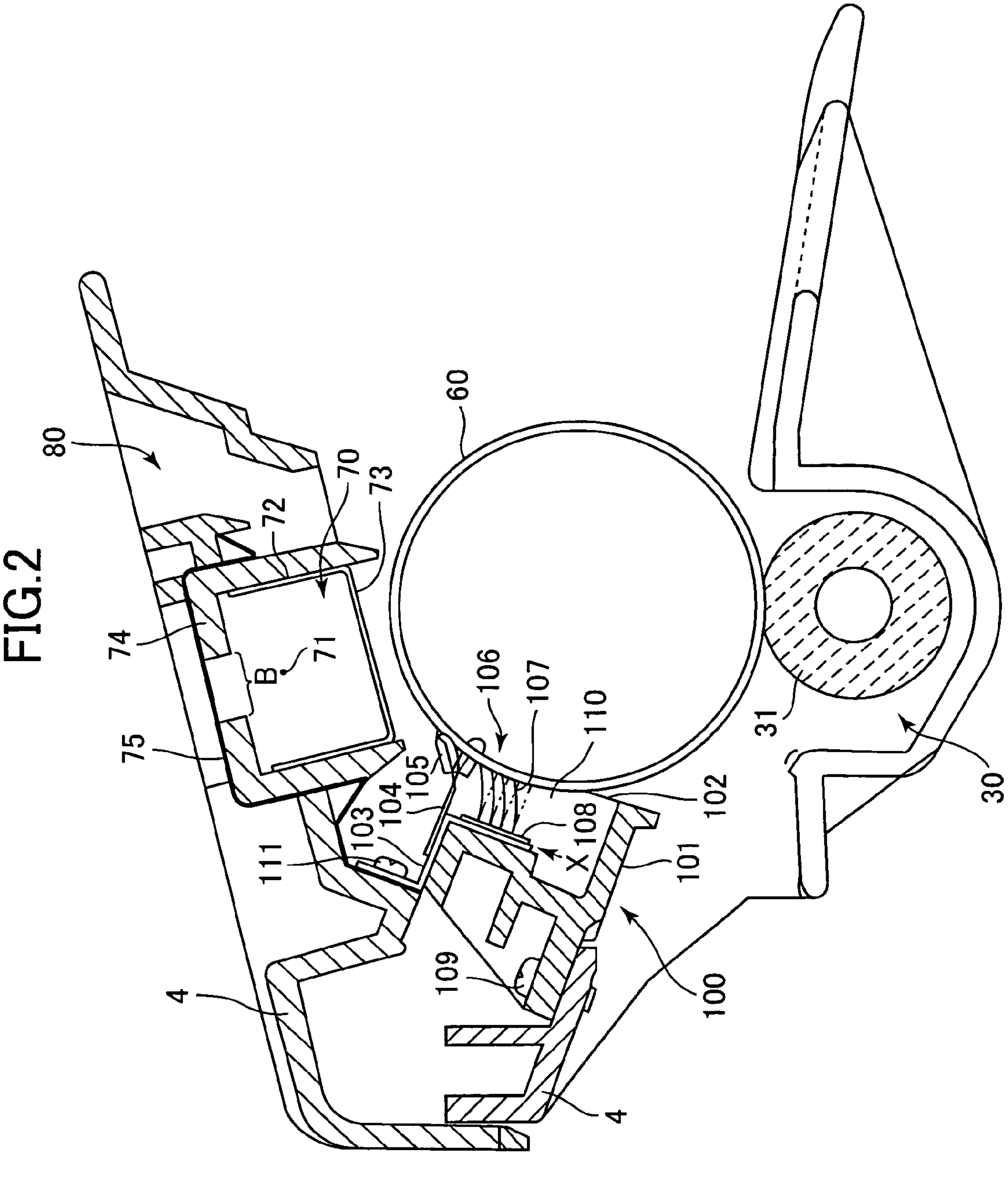
FIG. 2 is an enlarged cross-sectional view of the surroundings of a charging portion and a paper dust removal portion of the image forming device of FIG. 1.

The charging unit 70 is a scorotron-type charger that uniformly charges the surface of the photosensitive drum 60 to a positive charge. As shown in FIG. 2, the charging unit 70 includes a corona wire 71 that discharges a corona discharge, a shield 72 that covers the corona wire 71, a grid electrode 73 disposed opposite the corona wire 71, and a charge trapping electrode 75.

The shield 72 and the grid electrode 73 are formed integrally with each other. An aperture B is formed in a holder portion 74 of the shield 72. The charge trapping electrode 75 is provided on the shield 72 so as to cover the aperture B, and one edge of the charge trapping electrode 75 extends as far as the paper dust removal unit 100.

With this configuration, the charge trapping electrode 75 covering the aperture B directly receives ions discharged from the corona wire 71 and is charged thereby. The charge imparted to the charge trapping electrode 75 in this way is supplied to the paper dust removal unit 100. In other words, the charging unit 70 charges the paper dust removal unit 100 to the same polarity as the toner.

The irradiating section 80 is a channel formed through the upper surface of the frame 4 for letting a light emitted from the optical unit 10 to reach the photosensitive drum 60.

The developing unit 90 is for supplying toner to the photosensitive drum 60. As shown in FIG. 1, the developing unit 90 includes a toner accommodation chamber 92 and an agitator 93 supported inside the toner accommodation chamber 92 to be able to rotate around a shaft 94. Toner accommodated inside the toner accommodation chamber 92 is non-magnetic positive-charging single-component toner.

The toner includes a base-particle having diameter of 6 μm to 10 μm, with an average diameter of 8 μm. The base-particle is formed of a styrene-acrylic resin formed spherically by a suspension polymer and added with colorant, such as carbon black, and a charge-control agent, such as nigrosin, triphenylmethane, or a quarternary ammonium salt. Silica is added to the surfaces of the toner base-particles as an external additive.

A developer chamber 95 is formed on the photosensitive drum 60 side of the toner accommodation chamber 92, communicating with the toner accommodation chamber 92 through an aperture A. A supply roller 96 and a developer roller 97 are rotatably supported in the developer chamber 95. The toner on the developer roller 97 is regulated to a predetermined thickness by a layer thickness regulation blade 98 that has a thin elastic metal plate and a contact portion formed of silicone rubber on the leading edge of the metal plate.

The transfer unit 30 is for transferring a toner image formed on the photosensitive drum 60 to recording paper and includes a transfer roller 31. The transfer roller 31 is supported in a freely rotatable manner and includes a foamed elastic body having electrical conductivity formed of silicone rubber or urethane rubber, for example. Recording paper conveyed by the registration rollers 25 is pressed between the transfer roller 31 and the photosensitive drum 60. During this time, the transfer roller 31 is applied with a voltage of the opposite polarity of that of the toner image and transfers the toner image from the photosensitive drum 60 onto the recording paper. Paper dust that has migrated from the recording paper to the photosensitive drum 60 at the transfer position is removed by the paper dust removal unit 100. Any toner remaining on the surface of the photosensitive drum 60 after the transfer is recovered by the developing unit 90 and is supplied again to the development.

A cartridge accommodating portion 50 for the accommodating the process cartridge 3 is provided within the main casing 2. The process cartridge 3 can be inserted to or removed from the main casing 2 by opening a cover (not shown) provided in an upper portion of the main casing 2. A guide member (not shown) for guiding the process cartridge 3 is provided within the main casing 2. The process cartridge 3 is installed into the main casing 2 by inserting the process cartridge 3 along the guide member and closing the cover.

The fixing unit 40 is for fixing a toner image transferred on the recording paper onto the recording paper and includes a heat roller 41 and a pressing roller 42. As the recording paper with the toner image transferred thereon passes through between the heat roller 41 and the pressing roller 42, the rollers 41 and 42 apply pressure and heat to the recording paper, thereby thermally fixing the toner image onto the recording paper.

Next, the paper dust removal unit 100 will be described. As described above, any toner remaining on the photosensitive drum 60 after the transfer is recovered by the developing unit 90 and is once again used in the development. The paper dust removal unit 100 prevents paper dust from mixing into the developing unit 90, thus enabling favorable image formation. Note that because the charging unit 70 applies a voltage of the same polarity as the toner to the paper dust removal unit 100, trapping of toner can be prevented as far as possible.

As shown in FIG. 2, the paper dust removal unit 100 includes a holder 101, a urethane film 102, an electrically conductive plate 103, a urethane sheet 104, and a brush-shaped member 106.

The holder 101 has substantially the same length as the photosensitive drum 60 in the longitudinal direction of the photosensitive drum 60, and is affixed to the frame 4 by screws 109 at both end portions in its longitudinal direction. A storage chamber 110 is formed in the holder 101 in a position facing the photosensitive drum 60, for holding the removed paper dust.

The urethane film 102 is attached on the lower edge of the holder 101. A free edge of the urethane film 102 is in contact with the photosensitive drum 60. The urethane film 102 prevents the paper dust that has been removed from the photosensitive drum 60 from falling out of the storage chamber 110.

The plate 103 is attached on the holder 101 and extends in the longitudinal direction of the photosensitive drum 60 along the upper and side surfaces of the holder 101. An edge portion of the plate 103 and an edge portion of the charge trapping electrode 75 are fixed to the frame 4 by screws 111. The plate 103 is formed of an electrically conductive member, such as stainless steel or aluminum, and the charge trapping electrode 75, the plate 103, and the brush-shaped member 106 are electrically connected one another. Since the charge trapping electrode 75 is charged by directly receiving ions discharged from the corona wire 71 as described previously, the plate 103 and the brush-shaped member 106 in electrical contact with the charge trapping electrode 75 are also charged.

The urethane sheet 104 is a sheet-shaped member formed of urethane rubber and has a hardness of 92° Hs (JIS K-6301). A fibrous member 105 is fixed to the free end of the urethane sheet 104 such that the fibrous member 105 is folded in two about the tip of the free end of the urethane sheet 104. The urethane sheet 104 is attached to the upper section of the plate 103 such that the fibrous member 105 on its free end reaches the position shown by the broken line in FIG. 2 when the photosensitive member 60 is removed. The fibrous member 105 is formed of fibers which have been entangled with one another. Using fibrous member 105 formed of fibers having a high degree of freedom enables to trap fine paper dust between the fibers. Such fibers as polyester fibers or polyamide fibers can be used for the fibrous member 105. The fibrous member 105 has substantially the same length as the photosensitive drum 60 in the longitudinal direction.

The brush-shaped member 106 is for wiping off paper dust and includes fibers 107 and a foundation cloth 108 into which the fibers 107 are implanted. The foundation cloth 108 has an elongated shape, with a longitudinal dimension that is substantially the same as that of the photosensitive drum 60 along the surface of the plate 103 that faces the photosensitive drum 60. In this embodiment, a woven fabric is used as the foundation cloth 108, and acrylic fibers are used as the fibers 107.

Figure 3:
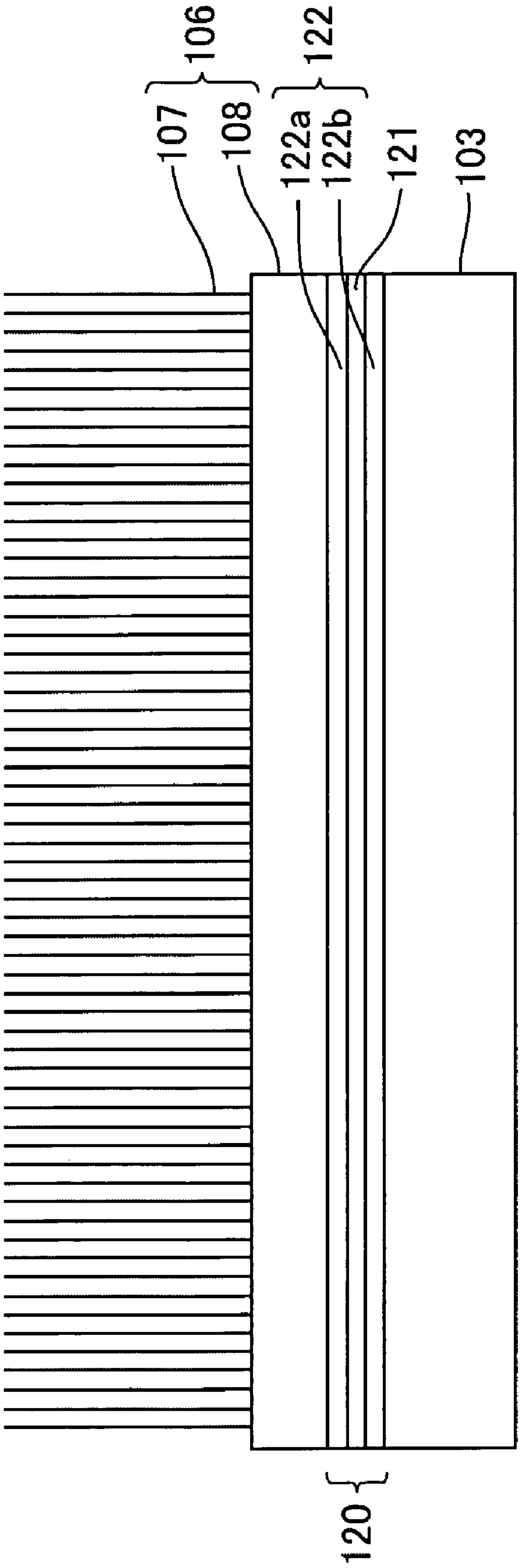
FIG. 3 is a schematic view of a paper dust removal member and a plate bonded together by a two-sided tape, as seen from the X direction in FIG. 2.

As shown in FIG. 3, the brush-shaped member. 106 is affixed to the plate 103 by a two-sided tape 120. The two-sided tape 120 has a tape substrate 121 and bonding layers 122. The bonding layers 122 includes a bonding layer **122*a* that covers one surface of the tape substrate 121 and another bonding layer 122*b* that covers the other surface of the substrate 121**.

The tape substrate 121 is formed of a non-woven fabric. A non-woven fabric exhibits electrical conductivity by absorbing moisture from the surroundings, so that when a voltage is applied to the plate 103 by the charge trapping electrode 75, charge is supplied smoothly to the brush-shaped member 106 via the two-sided tape 120. The main component of the bonding layers 122 is an acrylic type of macromolecule in which the monomer composition and molecular weight are controlled.

In this embodiment, #8800CH manufactured by Dai Nippon Ink and Chemicals, Inc., is used as the two-sided tape 120. Measurements of the shear adhesive strength with respect to a stainless steel plate and tensile strength of #8800CH are described below. Note that the shear adhesive strength represents the magnitude of shear adhesive strength possessed by the bonding layer when the tape is affixed to a test plate then is peeled off. In general, the strong shear adhesive strength of the tape means that the adhesive strength of the bonding layer is strong. The tensile strength represents the magnitude of the force added to the tape when the tape breaks due to being pulled. In general, the large tensile strength means that the strength of the tape substrate is large.

#8800CH has a shear adhesive strength of 14.7N/20 mm when a stainless-steel plate is used as a test plate and left the assembly for one hour at 23° C. Also, #8800CH has a tensile strength of 29.4N/20 mm when subjected to tension testing at 23° C. In other words, when #8800CH is used as the two-sided tape 120 of this embodiment, and the two-sided tape 120 is bonded to the plate 103 which is made of a metal, such as stainless steel or aluminum, the tensile strength of the two-sided tape 120 is greater than the shear adhesive strength between the two-sided tape 120 and the plate 103.

#8800CH has a shear adhesive strength of 15.7N/20 mm when a stainless-steel plate is used as a test plate and the assembly is held at 50° C. for 100 hours. In other words, even after #8800CH was held at a high temperature, the tensile strength of 29.4N/20 mm is still greater than the shear adhesive strength between the #8800CH and the stainless-steel plate. During image formation, the temperature within the process cartridge 3 is 45° C. to 50° C. However, the use of #8800CH as the two-sided tape 120 makes it possible to maintain a tensile strength that is greater than the shear adhesive strength between the two-sided tape 120 and the plate 103, without any change in the properties of the two-sided tape 120 even after the two-sided tape 120 has been placed in a high-temperature environment during image formation.

Figure 4:
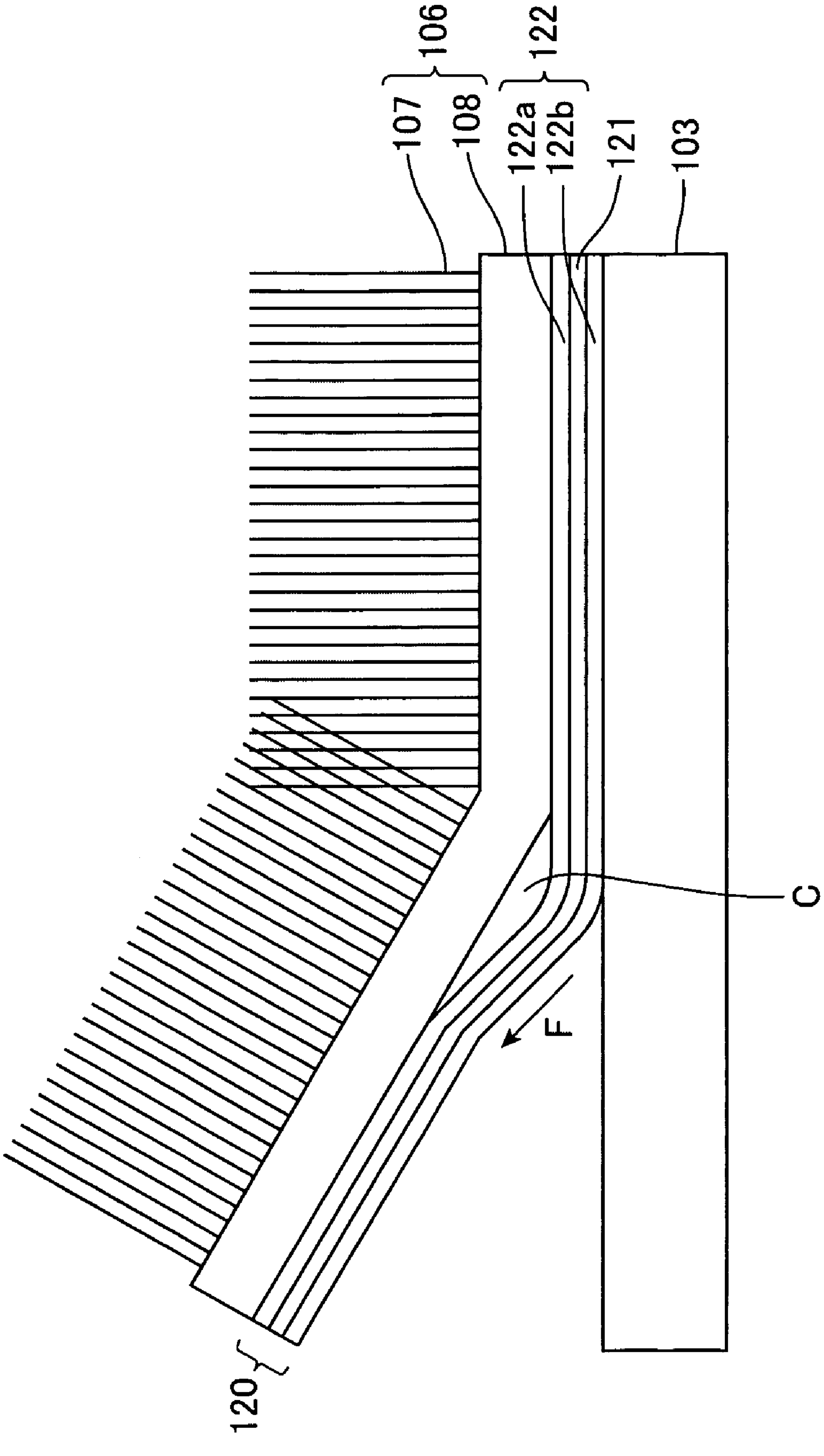
FIG. 4 is a conceptual view of the state in which the brush-shaped member is being peeled from the plate.

FIG. 4 is a conceptual diagram of a state in which the brush-shaped member 106 that has been bonded to the plate 103 by the two-sided tape 120 is peeled off from the plate 103. Since the foundation cloth 108 of the brush-shaped member 106 is made of a woven fabric, there are irregularities in the surface of the brush-shaped member 106 on which the two-sided tape 120 is bonded. This means that the shear adhesive strength between the two-sided tape 120 and the brush-shaped member 106 tends to be smaller than the shear adhesive strength between the two-sided tape 120 and the plate 103. If the shear adhesive strength between the two-sided tape 120 and the brush-shaped member 106 is less than the shear adhesive strength between the two-sided tape 120 and the plate 103, when the brush-shaped member 106 is peeled off from the plate 103, a gap C is created between the two-sided tape 120 and the brush-shaped member 106 as shown in FIG. 4. If such a gap C is created, a tension force F will act directly on the two-sided tape 120. However, since the tensile strength of the two-sided tape 120 is greater than the shear adhesive strength between the two-sided tape 120 and the plate 103, there is no tearing of the two-sided tape 120 when the brush-shaped member 106 is peeled off. In other words, it is possible to improve the operation of recycling the process cartridge 3, without any tearing of the two-sided tape 120 when peeling off the used brush-shaped member 106 so as to re-use the holder 101 and the plate 103.

Other two-sided tapes, such as No. 5000NS produced by Nitto Denko Corp., No. 7223 produced by Teraoka Manufacturing Co., or No. 9445 produced by Sumitomo 3M, have the tensile strength greater than the shear adhesive strength with respect to a metal plate, such as a stainless-steel plate. Any of these two-sided tape could be used as the two-sided tape 120 instead of #8800CH.

In the image forming device 1 having the above configuration, the surface of the rotating photosensitive drum 60 (FIG. 1) is charged uniformly by the charging unit 70, and a latent image is formed on the surface of the photosensitive drum 60 when exposed by light emitted from the optical unit 10, which has been modulated in accordance with image information, through the exposure portion 80. The developing unit 90 forms a toner image on the photosensitive drum 60 by selectively supplying toner to the photosensitive drum 60 on which the latent image is formed. This toner image is transported by rotation of the photosensitive drum 60 to the transfer position (the position at which the transfer roller 31 faces the photosensitive drum 60). In synchronization with this, the conveying unit 20 feeds a recording paper to the transfer position by the paper-supply roller 23 and the registration rollers 25. The transfer roller 31 that is applied with a transfer bias transfers the toner image from the surface of the photosensitive drum 60 onto the recording paper at the transfer position.

The recording paper is then fed into the fixing unit 40 and passes between the heat roller 41 and the pressing roller 42, so that the toner image on the recording paper is fixed onto the recording paper. Subsequently, the recording paper is discharged onto a paper discharge tray 27 on the top of the main casing 2 by the pairs of feed rollers 28 and paper discharge rollers 26 provided in sequence on the downstream side of the fixing unit 40, to end the image forming operation.

Any toner remaining on the photosensitive drum 60 after the transfer is recovered by the developing unit 90 and is again used for the development. That is, the image forming device 1 of this embodiment employs a cleanerless development method. Since it is therefore not necessary to provide a waste toner storage container for storing residual toner that have been wiped off the photosensitive drum 60, the image forming device 1 can be made smaller, and the toner can be used efficiently.

In addition, paper dust will adhere on the photosensitive drum 60 after the transfer, but fiber-like large paper dust will be caught by the brush-shaped member 106, and the finer paper dust will be removed by the fibrous member 105. In particular, since a voltage is applied to the brush-shaped member 106 by the charge trapping electrode 75, an extremely high paper dust removal capability is exhibited. The paper dust has been charged to the opposite polarity to that of the toner by a bias that is applied during the transfer. Since a reverse development method is used in this embodiment, the polarity of the voltage applied to the charging unit 70 is the same as the polarity to which the toner is charged. Thus, the polarities of the charge trapping electrode 75 and the brush-shaped member 106 are also the same as the polarity to which the toner is charged, making it possible to recover the paper dust easily.

As described above, according to the present embodiment, a two-sided tape that has a substrate with a high tensile strength and bonding layers with a low shear adhesive strength with respect to a conductive plate can be used as the two-sided tape 120 of the present embodiment. Therefore, the fabrication of the two-sided tape 120 can be simplified. Also, the brush-shaped member 106 can be removed easily with a small force by working along the longitudinal direction of the two-sided tape 120.

The two-sided tape 120 bonds to the cloth 108 and the plate 103. Since the cloth 108 can be pulled to peel the brush-shaped member 106 off from the comparatively hard plate 103, the brush-shaped member 106 can be peeled off easily.

While some exemplary embodiments of this invention have been described in detail, those skilled in the art will recognize that there are many possible modifications and variations which may be made in these exemplary embodiments while yet retaining many of the novel features and advantages of the invention.

Figure 5:
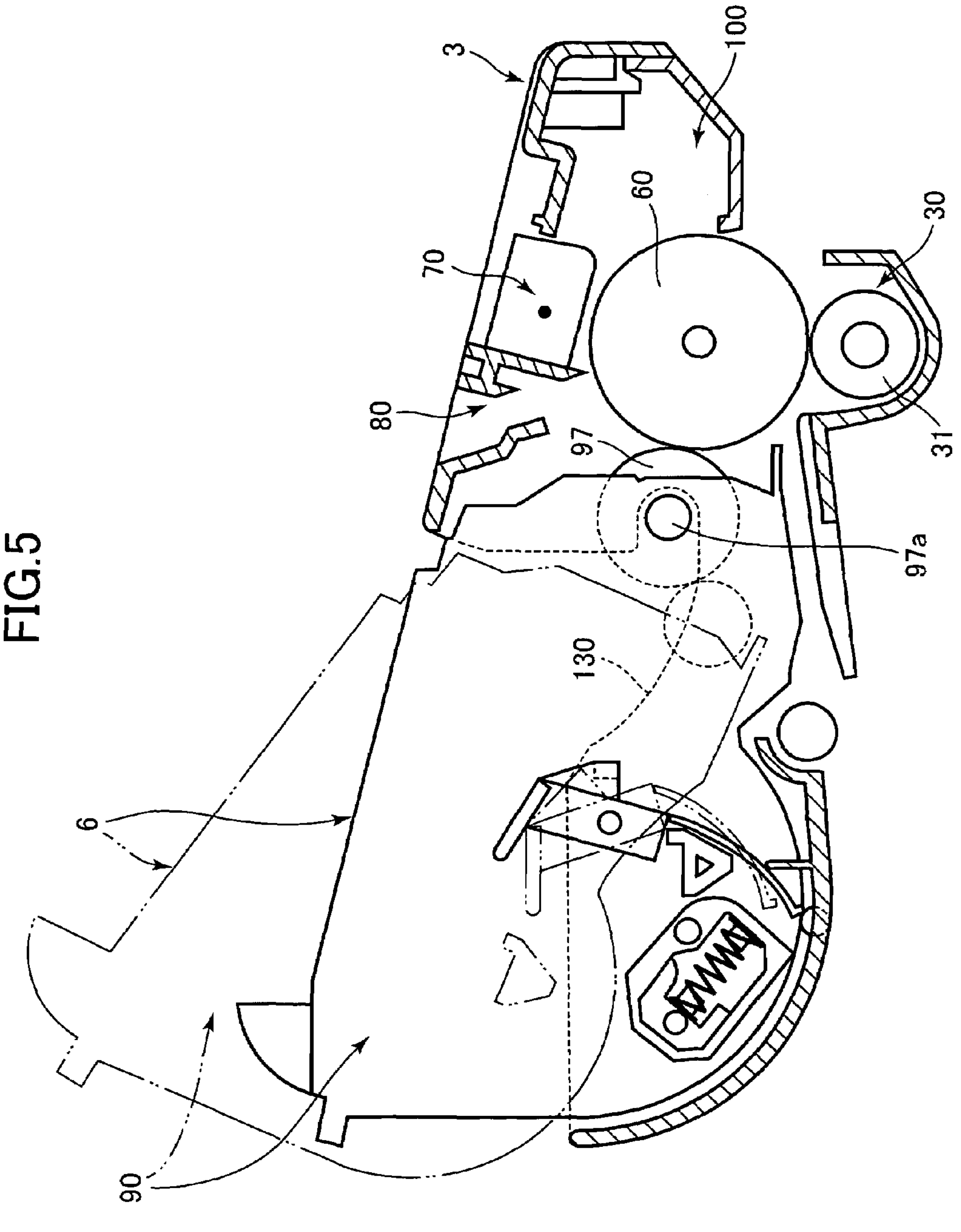
FIG. 5 is an explanatory view of a developer cartridge being inserted into or removed from a process cartridge according to a modification of the embodiment of the present invention.

For example, in the embodiment described above, the developing unit 90 is formed as a part of the process cartridge 3. However, as shown in FIG. 5, a developer cartridge 6 that can be detachably mounted into the process cartridge 3 could be provided, and the developing unit 90 could be made separate from the process cartridge 3 by providing the developing unit 90 within the developer cartridge 6. During the image formation process, in this case, the process cartridge 3 with the developer cartridge 6 mounted therein is mounted in the main casing 2 in a similar manner to the previously described embodiment. Such a developer cartridge 6 is inserted into the process cartridge 3 with the developer roller 97 leading, and a roller shaft 97*a* that protrudes from both lateral sides of the developer roller 97 is guided along guide portions 130 of the process cartridge 3 so that the developer roller 97 comes into contact with the photosensitive drum 60.

In general, the photosensitive drum 60 has a lifetime that is approximately five times that of the developing unit 90. The above configuration ensures that the developer cartridge 6 alone can be exchanged within the process cartridge 3 when the developing unit 90 wears out, which reduces the cost in comparison with a case in which the entire process cartridge 3 including the developer cartridge 6 is replaced.

It is therefore possible to vary the design of the process cartridge 3 as appropriate, provided the process cartridge 3 includes the photosensitive drum 60 and the paper dust removal unit 100.

In addition, the shear adhesive strength between the bonding layer 122*a* and the brush-shaped member 106 shown in FIG. 3 could be made greater than the shear adhesive strength between the bonding layer 122*b* and the plate 103. In this case, when the brush-shaped member 106 is pulled to peel the same off from the plate 103, the gap C shown in FIG. 4 is not formed between the brush-shaped member 106 and the two-sided tape 120. Since the tension force F therefore acts not only on the two-sided tape 120 but also on the foundation cloth 108 of the brush-shaped member 106, the tension force F is dispersed, making it even more difficult for the two-sided tape 120 to tear.

The surface of the plate 103 could be subjected to plating with metal, such as nickel. This smoothes the surface of the plate 103 and also increases the electrical conductivity of the plate 103. Smoothing the surface of the plate 103 reduces the shear adhesive strength between the brush-shaped member 106 and the plate 103, thus making it more difficult for the tape substrate 121 to tear when the brush-shaped member 106 is peeled off from the plate 103. In addition, the improvement of the electrical conductivity enables to supply the charge from the charge trapping electrode 75 more smoothly to the brush-shaped member 106.

Furthermore, the two-sided tape 120 need not be limited to a three-layer configuration of the bonding layer 122*a*, the tape substrate 121, and the bonding layer 122*b*. Adhesive could be impregnated into a non-woven fabric that forms the tape substrate 121 so that the tape substrate 121 itself has bonding capabilities.

What is claimed is:

1. A process cartridge that is attachable to and detachable from an image forming device, the process cartridge comprising:

an image holding member;

a paper dust removal member that removes paper dust from the image holding member; and a conductive member that is configured to conduct a voltage supplied from the image forming device to the paper dust removal member, wherein the paper dust removal member is attached to the conductive member by a two-sided tape, the two-sided tape having an electrically-conductive substrate electrically connected to the conductive member, the substrate being formed of non-wovenfabric and exhibiting electrical conductivity by containing moisture, wherein the two-sided tape has a first bonding layer covering a first surface of the substrate and bonding to the paper dust removal member and a second bonding layer covering a second surface of the substrate opposite to the first surface and bonding to the conductive member, and a tensile strength of the two-sided tape is greater than a shear adhesive strength between the second bonding layer and the conductive member, and wherein a shear adhesive strength between the first bonding layer and the paper dust removal member is greater than the shear adhesive strength between the second bonding layer and the conductive member.

2. The process cartridge according to claim 1, wherein the tensile strength of the two-sided tape is strength in a longitudinal direction of the two-sided tape.

3. The process cartridge according to claim 1, wherein the paper dust removal member is a brush-shaped member including fibers and a cloth into which the fibers are implanted, and the conductive member is a plate having electrical conductivity, and the two-sided tape attaches the cloth of the paper dust removal member to the conductive member.

4. The process cartridge according to claim 1, wherein the conductive member is subjected to processing to smooth the surface of the conductive member.

5. The process cartridge according to claim 1, wherein a surface of the conductive member is subjected to processing that increases the electrical conductivity of the conductive member.

6. The process cartridge according to claim 1, wherein the conductive member is subjected to surface processing by metal plating.

7. The process cartridge according to claim 1, wherein the tensile strength of the two-sided tape is greater than the shear adhesive strength between the two-sided tape and the conductive member, after the two-sided tape is held at 50° C. for 100 hours.

8. An image forming device comprising:

an image holding member;

a charging unit that charges a surface of the image holding member;

an irradiating unit that irradiates the surface of the image holding member with light to form an electrostatic latent image on the surface of the image holding member;

a developing unit that develops the electrostatic latent image into a visible image;

a transfer unit that transfers the visible image from the surface of the image holding member onto a recording medium;

a conveying unit that conveys the recording medium;

a paper dust removal member that removes paper dust from the image holding member; and a conductive member that is attached to the paper dust removal member by a two-sided tape, the two-sided tape having an electrically-conductive substrate electrically connected to the conductive member, the substrate being formed of non-woven fabric and exhibiting electrical conductivity by containing moisture, wherein the two-sided tape has a first bonding layer covering a first surface of the substrate and bonding to the parer dust removal member and a second bonding layer covering a second surface of the substrate opposite to the first surface and bonding to the conductive member, and a tensile strength of the two-sided tape is greater than a shear adhesive strength between the second bonding layer and the conductive member, and wherein a shear adhesive strength between the first bonding layer and the paper dust removal member is greater than the shear adhesive strength between the second bonding layer and the conductive member.

9. The image forming device according to claim 8, wherein the tensile strength of the two-sided tape is strength in a longitudinal direction of the two-sided tape.

10. The image forming device according to claim 8, wherein the paper dust removal member is a brush-shaped member including fibers and a cloth into which the fibers are implanted, and the conductive member is a plate having electrical conductivity, and the two-sided tape attaches the cloth of the paper dust removal member to the conductive member.

11. The image forming device according to claim 8, wherein the conductive member is subjected to processing to smooth the surface of the conductive member.

12. The image forming device according to claim 8, wherein a surface of the conductive member is subjected to processing that increases the electrical conductivity of the conductive member.

13. The image forming device according to claim 8, wherein the conductive member is subjected to surface processing by metal plating.

14. The image forming device according to claim 8, wherein the tensile strength of the two-sided tape is greater than the shear adhesive strength between the two-sided tape and the conductive member, after the two-sided tape is held at 50° C. for 100 hours.

15. The image forming device according to claim 8, wherein the charging unit charges the paper dust removal member via the conductive member.

* * * * *